US008213501B2

(12) United States Patent (10) Patent No.: US 8,213,501 B2
Boon et al. (45) Date of Patent: *Jul. 3, 2012

(54) VIDEO ENCODING METHOD, VIDEO DECODING METHOD, VIDEO ENCODING PROGRAM, VIDEO DECODING PROGRAM, VIDEO ENCODING APPARATUS, AND VIDEO DECODING APPARATUS

(75) Inventors: Choong Seng Boon, Yokohama (JP);
Satoru Adachi, Yokohama (JP);
Sadaatsu Kato, Yokosuka (JP); Thiow Keng Tan, Jala Sindor (SG)

(73) Assignee: NTT DoCoMo, Inc., Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 12/894,850

(22) Filed: Sep. 30, 2010

(65) Prior Publication Data

US 2011/0019744 A1 Jan. 27, 2011

Related U.S. Application Data

(60) Continuation of application No. 12/020,362, filed on Jan. 25, 2008, now abandoned, which is a division of application No. 10/715,435, filed on Nov. 19, 2003, now Pat. No. 7,324,593.

(30) Foreign Application Priority Data

Dec. 10, 2002 (JP) ............................... P2002-358518
Jul. 2, 2003 (JP) ............................... P2003-190563

(51) Int. Cl.
*H04B 1/66* (2006.01)
*H04N 7/12* (2006.01)
(52) U.S. Cl. ............................... 375/240.02; 348/403.1
(58) Field of Classification Search .................. 348/403, 348/413, 400, 401, 402, 409, 411, 412, 414, 348/415, 416, 423, 422, 421, 420, 419; 375/240.01–240.26; 382/232, 233, 238, 382/234, 235, 236, 237, 240

See application file for complete search history.

(56) References Cited

U.S. PATENT DOCUMENTS 5,227,878 A 7/1993 Puri et al.
6,094,225 A 7/2000 Han
6,154,570 A 11/2000 Boon
(Continued)

FOREIGN PATENT DOCUMENTS

JP 03-001688 A 1/1991
(Continued)

OTHER PUBLICATIONS

Office Action from co-pending U.S. Appl. No. 12/020,362, dated Oct. 15, 2010, 8 pages.

(Continued)

*Primary Examiner* — Behrooz Senfi
(74) *Attorney, Agent, or Firm* — Brinks Hofer Gilson & Lione

(57) ABSTRACT

In a video encoding method according to the present invention, an encoding mode controller 102 determines an encoding mode of each image on the occasion of encoding a moving picture consisting of a plurality of images, and a region partitioning unit 104 determines a region structural unit for partitioning the image into multiple regions, based on the encoding mode. A region determining unit 116 defines the regions on the basis of the region structural unit and information thereof is encoded. Then an encoder 105 compression-encodes pixel data included in the regions, in encoding units to generate compression-encoded data according to the encoding mode, and outputs the resultant data.

12 Claims, 10 Drawing Sheets

U.S. PATENT DOCUMENTS

| | | |
|---|---|---|
| 6,229,930 B1 | 5/2001 | Kadono |
| 6,259,734 B1 | 7/2001 | Boon |
| 6,292,590 B1 | 9/2001 | Kondo et al. |
| 6,310,916 B1 | 10/2001 | Han |
| 6,359,929 B1 | 3/2002 | Boon |
| 2001/0022855 A1 | 9/2001 | Matsumoto |

FOREIGN PATENT DOCUMENTS

| | | |
|---|---|---|
| JP | 10-004549 A | 1/1998 |
| JP | 11-112986 A | 4/1999 |
| JP | 2004-242271 A | 8/2004 |
| KR | 2001-0032272 A | 4/2001 |

OTHER PUBLICATIONS

Ono, Fumitaka et al., "Basic Technologies on International Image Coding Standards," Corona Publishing Co., Ltd., Mar. 20, 1998, pp. 236-267 (with translation).

Japanese Office Action dated Mar. 20, 2007.

Notice of Patent Grant Issued Aug. 16, 2007 in Korean patent application No. 10-2003-0089060 (with translation).

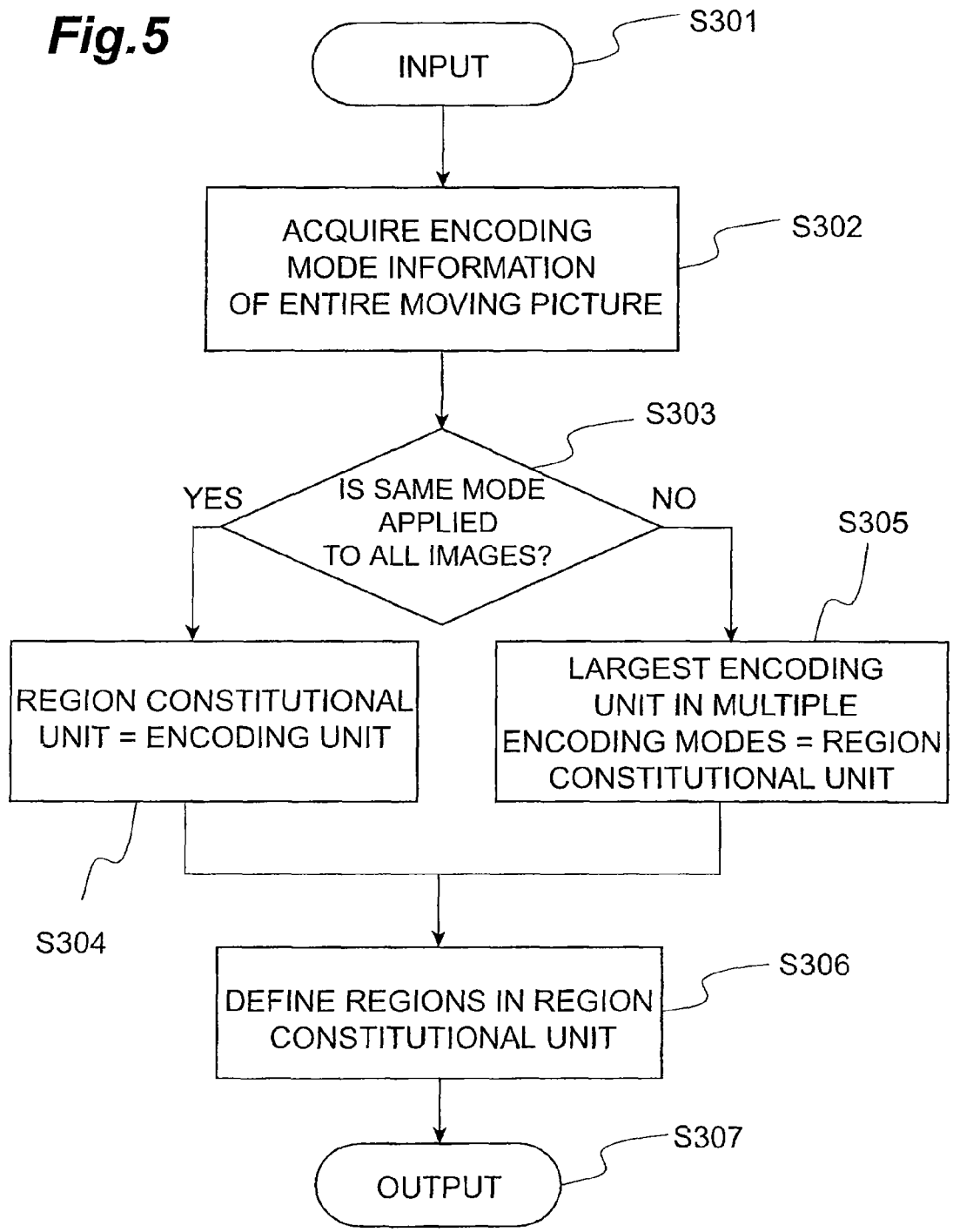

VIDEO ENCODING METHOD, VIDEO DECODING METHOD, VIDEO ENCODING PROGRAM, VIDEO DECODING PROGRAM, VIDEO ENCODING APPARATUS, AND VIDEO DECODING APPARATUS

RELATED APPLICATIONS

This application is a continuation application of U.S. application Ser. No. 12/020,362 filed on Jan. 25, 2008 now abandoned, which is a divisional application of U.S. application Ser. No. 10/715,435 filed on Nov. 19, 2003, now U.S. Pat. No. 7,324,593, which claims priority to JP2002-358518 filed on Dec. 10, 2002 and JP2003-190563 filed on Jul. 2, 2003.

BACKGROUND OF THE INVENTION

1. Field of the Invention

The present invention relates to compression encoding and decoding of moving pictures and, more particularly, to a method of efficiently transmitting encoding conditions.

2. Related Background Art

Conventionally, compression encoding techniques of moving picture signals are used for transmission and storage-regeneration of moving picture signals. The well-known techniques include, for example, the international standard video coding methods such as ITU-T Recommendation H.263, ISO/IEC International Standard 14496-2 (MPEG-4 Visual), and so on.

Another known newer encoding system is a video coding method scheduled for joint international standardization by ITU-T and ISO/IEC; ITU-T Recommendation H.264 and ISO/IEC International Standard 14496-10. The general encoding techniques used in these video coding methods are disclosed, for example, in nonpatent Document 1 presented below.

[Nonpatent Document 1]

Basic Technologies on International Image Coding Standards (co-authored by Fumitaka Ono and Hiroshi Watanabe and published Mar. 20, 1998 by CORONA PUBLISHING CO., LTD.)

SUMMARY OF THE INVENTION

In these encoding methods, an encoding apparatus is configured to partition an image into multiple regions and perform an encoding operation thereof under the same conditions for each of the regions. The encoding apparatus groups pixel values included in each region, into a plurality of encoding units, thereafter obtains residuals from predetermined predictive signals, and then performs Discrete Cosine Transform (DCT) of the difference signals, quantization of coefficients of DCT, and variable-length encoding of quantized data. This results in generating compression-encoded data (bitstream).

Sizes of encoding units differ depending upon image encoding conditions (hereinafter referred to as "encoding modes"). FIG. 1 is a diagram showing relations between image encoding modes and encoding units. One of the encoding modes is a mode called a frame encoding mode of performing encoding without separating scan lines of an image (hereinafter referred to as "frame mode"). Numeral 802 in FIG. 1 denotes this frame mode. An encoding unit in this case is a macroblock consisting of 16×16 pixels.

In contrast to it, an encoding mode of performing encoding with separating scan lines of an image is called a field encoding mode (803 in FIG. 1, which will be referred to hereinafter as "field mode"). Numeral 804 in FIG. 1 designates a case wherein scan lines of an interlaced image are separated into even scan lines and odd scan lines. Encoding units in this case are macroblock units, similarly as in the case of the frame encoding, but an encoding unit after merging of the scan lines is 16×32 pixels.

Furthermore, there are a mode of performing encoding with separating scan lines in encoding units and a mode of performing encoding without separating scan lines in encoding units. Numeral 805 in FIG. 1 represents a case in which encoding is performed without separating scan lines in encoding units. Encoding units in this case are macroblocks. In the case where the scan lines are adaptively separated or not separated in encoding units (hereinafter referred to as "MB_AFF mode"), as indicated by 806 in FIG. 1, encoding units are represented by "macroblock pairs" each consisting of 16×32 pixels. As described above, the encoding apparatus changes the sizes of encoding units according to the encoding modes to achieve an optimal structure, thereby performing efficient compression encoding.

On the other hand, in partitioning of an image into multiple regions, the encoding apparatus is also configured to define the regions in most efficient encoding units in the encoding mode. FIG. 2(a) and FIG. 2(b) are diagrams showing examples of regions in images partitioned in prior art. The image 901 of FIG. 2(a) is partitioned into two regions; one being a region filled with the same pattern as block 902 and the other an unfilled region. The frame mode is assumed herein and region 903 is defined in macroblock units in an order as indicated by dashed arrow 904 from the center of the image. The image 905 of FIG. 2(b) is also partitioned into two regions, one being a region filled with the same pattern as block 906 and the other an unfilled region. The MB_AFF mode is assumed herein and region 907 is defined in units of "macroblock pairs" in an order indicated by dashed arrow 908 from the center of the image.

Compression-encoded data encoded in the encoding units is put together on a region-by-region basis and related information such as the encoding mode and others is attached thereto, followed by transmission or recording thereof. By putting the compression-encoded data together on a region-by-region basis, we can enjoy the advantage that even if there occurs an error because of contamination of data in a certain region the spread of the error to the other region can be suppressed. It is also feasible to perform parallel processing in region units and thus enables fast operation.

However, the above prior art has a problem as described below. Namely, it is required that, in the video encoding method of partitioning an image into multiple regions, the regions of temporally adjacent images be consistent with each other. In the prior art, however, the regions are defined on the basis of the encoding units and the encoding units are thus different depending on the encoding modes. For this reason, in the case where the encoding modes of adjacent images are different from each other, patterns of regions will be different even when defined under the same conditions.

For example, supposing the image 901 and the image 905 are two temporally adjacent images, patterns of region 903 and region 907 are different because of the difference between the encoding modes of the respective images. In such inconsistent cases, corresponding regions will change their shape with time, and when the images in the regions are displayed on the time axis, it will be heavily obstructive to human's perception.

Furthermore, by observing rectangle 909 in FIG. 2(a) and rectangle 910 in FIG. 2(b), it can be seen that the lower half block of rectangle 910 belongs to the other region (unfilled region) in the image 901. Namely, a block corresponding to the lower half block of rectangle 910 is absent before the unfilled region of image 901 is reproduced. Therefore, the pertinent block is not used in predictive coding and thus adversely affects the efficiency of compression encoding.

An object of the present invention is, therefore, to reduce the change of the region shape due to the difference of encoding modes in encoding and decoding of moving pictures and increase the efficiency of compression encoding.

In order to solve the above problem, a video encoding method according to the present invention is a video encoding method for video encoding apparatus to encode a moving picture partitioned into a plurality of regions, the video encoding method comprising: a step of determining an encoding mode of each image in encoding a moving picture consisting of a plurality of images; a step of determining a region structural unit for partitioning the image into multiple regions, based on the encoding mode; a step of defining the regions on the basis of the region structural unit; a step of encoding region information about the regions thus defined (e.g., information about shapes of the regions); a step of compression-encoding pixel data included in the regions, in encoding units to generate compression-encoded data according to the encoding mode; and an output step of outputting the encoding mode, the region information, and the compression-encoded data.

In the video encoding method according to the present invention, the encoding mode may be one selected from: a frame mode of performing encoding without separating scan lines constituting an image; a field mode of performing encoding with separating scan lines constituting an image; an encoding-unit-switching mode of dividing an image into a plurality of encoding units and performing encoding in each encoding unit by either the frame mode or the field mode; an image-unit-switching mode of performing encoding in each image unit by either the frame mode or the field mode; a first combination mode as a combination of the frame mode with the encoding-unit-switching mode; and a second combination mode as a combination of the field mode with the image-unit-switching mode.

In the video encoding method according to the present invention, each of the encoding units can be: a block consisting of N×N pixels when the encoding mode is the frame mode; a block consisting of N×N pixels when the encoding mode is the field mode; or a block consisting of N×M (M is a number of vertical pixels, and M=2N) pixels when the encoding mode is the encoding-unit-switching mode.

The video encoding method according to the present invention may be configured so that when all the images constituting the moving picture are encoded in one encoding mode, the region structural unit is the encoding unit, and so that when the images constituting the moving picture are encoded each in different encoding modes, the region structural unit is a largest encoding unit out of the encoding units of the different encoding modes.

A video decoding method according to the present invention is a video decoding method for video decoding apparatus to decode a moving picture partitioned into a plurality of regions, the video decoding method comprising: a step of effecting input of compression-encoded data generated from each of images constituting a moving picture, by partitioning the image into multiple regions and implementing compression encoding thereof; a step of specifying an encoding mode of each image from the compression-encoded data; a step of determining a region structural unit for partitioning the image into multiple regions, based on the encoding mode; a step of acquiring region information about the regions (e.g., information about shapes of the regions) from the compression-encoded data; a step of defining the regions, based on the region structural unit and the region information; a step of decoding the compression-encoded data included in the regions thus defined, in encoding units to generate regenerated data in encoding units; and a step of constructing a regenerated image from the regenerated data in encoding units in accordance with the encoding mode.

In the video decoding method according to the present invention, the encoding mode may be one selected from: a frame mode of performing encoding without separating scan lines constituting an image; a field mode of performing encoding with separating scan lines constituting an image; an encoding-unit-switching mode of dividing an image into a plurality of encoding units and performing encoding in each encoding unit by either the frame mode or the field mode; an image-unit-switching mode of performing encoding in each image unit by either the frame mode or the field mode; a first combination mode as a combination of the frame mode with the encoding-unit-switching mode; and a second combination mode as a combination of the field mode with the image-unit-switching mode.

In the video decoding method according to the present invention, each of the encoding units can be: a block consisting of N×N pixels when the encoding mode is the frame mode; a block consisting of N×N pixels when the encoding mode is the field mode; or a block consisting of N×M (M is a number of vertical pixels, and M=2N) pixels when the encoding mode is the encoding-unit-switching mode.

The video decoding method according to the present invention may be configured so that when all the images constituting the moving picture are encoded in one encoding mode, the region structural unit is the encoding unit, and so that when the images constituting the moving picture are encoded each in different encoding modes, the region structural unit is a largest encoding unit out of the encoding units of the different encoding modes.

A video encoding program according to the present invention is configured to let a computer execute processing associated with the above-stated video encoding method.

A video decoding program according to the present invention is configured to let a computer execute processing associated with the above-stated video decoding method.

A video encoding apparatus according to the present invention is a video encoding apparatus for encoding a moving picture partitioned into a plurality of regions, the video encoding apparatus comprising: encoding mode determining means for determining an encoding mode of each image in encoding the moving picture consisting of a plurality of images; region structural unit determining means for determining a region structural unit for partitioning the image into multiple regions, based on the encoding mode; region defining means for defining the regions on the basis of the region structural unit; region information encoding means for encoding region information about the regions thus defined; and data generating means for compression-encoding pixel data included in the regions, in encoding units to generate compression-encoded data according to the encoding mode.

A video decoding apparatus according to the present invention is a video decoding apparatus for decoding a moving picture partitioned into a plurality of regions, the video decoding apparatus comprising: data input means for effecting input of compression-encoded data generated from each of images constituting a moving picture, by partitioning the image into multiple regions and implementing compression encoding thereof; encoding mode determining means for determining an encoding mode of each image from the compression-encoded data; region structural unit determining means for determining a region structural unit for partitioning the image into multiple regions, based on the encoding mode; region information acquiring means for acquiring region information about the regions from the compression-encoded data; region defining means for defining the regions, based on the region structural unit and the region information; regenerated data generating means for decoding the compression-encoded data included in the regions thus defined, in encoding units to generate regenerated data in encoding units; and regenerated image constructing means for constructing a regenerated image from the regenerated data in encoding units in accordance with the encoding mode.

The video encoding method according to the present invention may also be configured so that, for all the images included in the moving picture, the region structural unit is a block consisting of N×N pixels, in a frame mode of performing encoding without separating scan lines constituting each image, the region structural unit is a block consisting of N×N pixels, in a field mode of performing encoding with separating scan lines constituting each image, the region structural unit is a block consisting of N×M (M is a number of vertical pixels, and M=2N) pixels, in an encoding-unit-switching mode of dividing each image into a plurality of encoding units and performing encoding in each encoding unit by either the frame mode or the field mode, or the region structural unit is a block consisting of N×M (M is a number of vertical pixels, and M=2N) pixels, in an image-unit-switching mode of performing encoding of each image in an image unit by either the frame mode or the field mode.

The video decoding method according to the present invention may also be configured so that, for all the images included in the moving picture, the region structural unit is a block consisting of N×N pixels, in a frame mode of performing encoding without separating scan lines constituting each image, the region structural unit is a block consisting of N×N pixels, in a field mode of performing encoding with separating scan lines constituting each image, the region structural unit is a block consisting of N×M (M is a number of vertical pixels, and M=2N) pixels, in an encoding-unit-switching mode of dividing each image into a plurality of encoding units and performing encoding in each encoding unit by either the frame mode or the field mode, or the region structural unit is a block consisting of N×M (M is a number of vertical pixels, and M=2N) pixels, in an image-unit-switching mode of performing encoding of each image in an image unit by either the frame mode or the field mode.

A video encoding apparatus according to the present invention can also be configured to comprise input means for effecting input of a moving picture consisting of a plurality of images; encoding mode controlling means for determining an encoding mode of each image in encoding the moving picture; region structural unit determining means for determining a region structural unit for partitioning each image into multiple regions, based on the encoding mode; region partitioning means for defining regions on the basis of the region structural unit and partitioning each image into multiple regions; encoding means for compression-encoding region information about the regions thus defined, information of the encoding mode, and pixel data included in the regions to generate compression-encoded data; and outputting means for outputting the compression-encoded data.

A video decoding apparatus according to the present invention can also be configured to comprise input means for effecting input of compression-encoded data generated by partitioning each of images constituting a moving picture, into multiple regions and implementing compression encoding thereof; encoding mode specifying means for specifying an encoding mode of each image, based on the compression-encoded data; region structural unit determining means for determining a region structural unit for partitioning each image into multiple regions, based on the encoding mode; region defining means for acquiring region information about the regions, based on the compression-encoded data, and for defining the regions, based on the region structural unit and the region information; and decoding means for decoding the compression-encoded data included in the regions thus defined, to construct a regenerated image in accordance with the encoding mode.

According to these aspects of the invention, on the occasion of partitioning each constitutive image of a moving picture into regions in different encoding modes, a region structural unit is determined according to the combination of the encoding modes, regions are defined based thereon, and encoding or decoding of the moving picture is carried out based thereon. This permits consistent regions to be defined between adjacent images, whereby it becomes feasible to reduce the change of region shape due to the difference of encoding modes and increase the efficiency of compression encoding.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a flowchart showing the flow of the process for determining regions for encoding.

FIG. 10(*b*) is a schematic diagram showing the appearance of a floppy disk as a recording medium. FIG. 10(*c*) is a schematic diagram showing a state in which the recording medium is mounted into a drive connected to a computer.

DESCRIPTION OF THE PREFERRED EMBODIMENTS

First Embodiment

First, the first embodiment of the present invention will be described with reference to the accompanying drawings.

Figure 1:
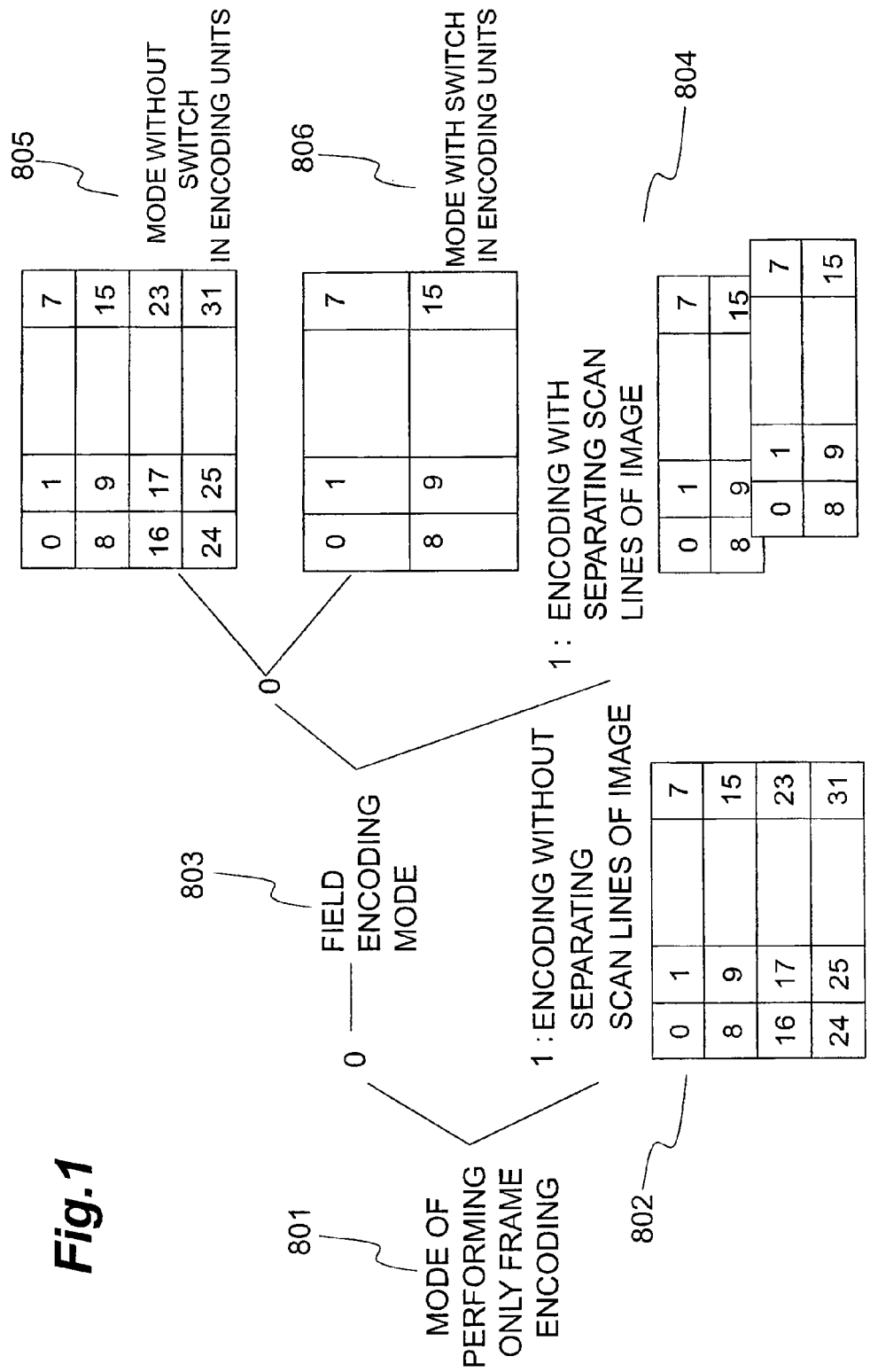
FIG. 1 is an illustration conceptually showing the encoding units of images in the encoding modes in the prior art.
Figure 2:
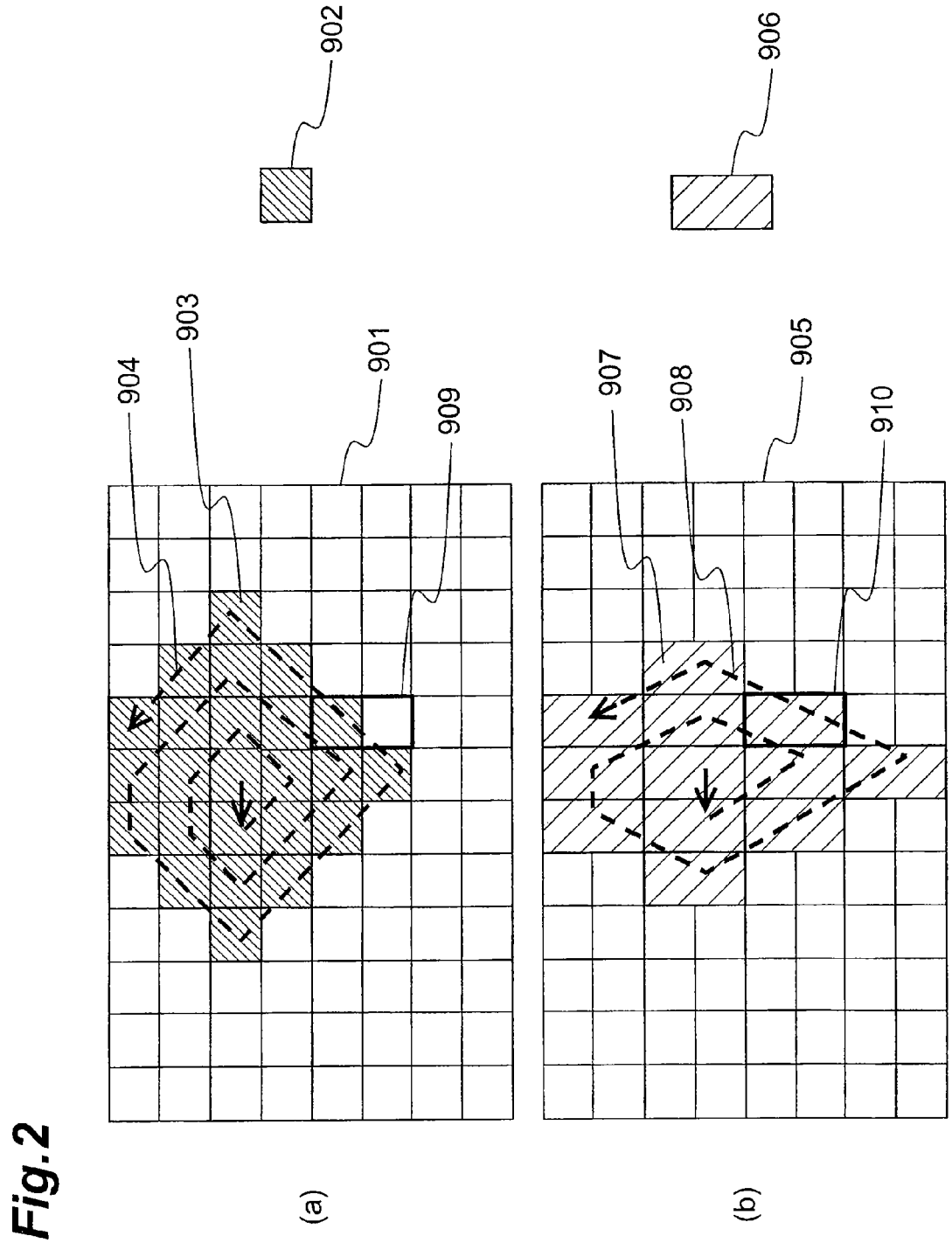
FIG. 2(a) is a diagram schematically showing regions of an image partitioned in the frame mode according to the prior art.
FIG. 2(b) is a diagram schematically showing regions of an image partitioned in the MB_AFF mode according to the prior art.
Figure 3:
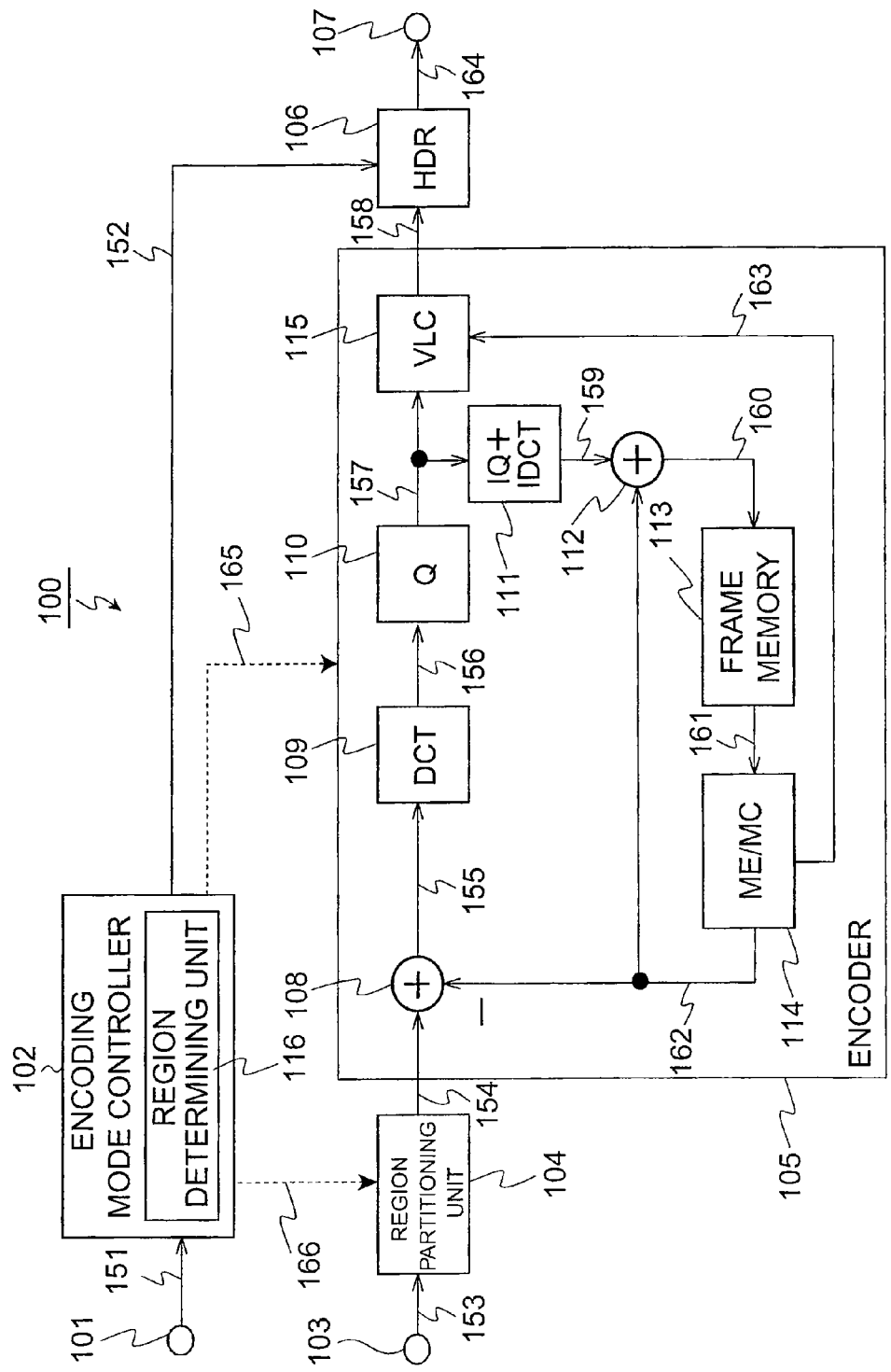
FIG. 3 is a block diagram showing the schematic configuration of the video encoding apparatus according to the present invention.

FIG. 3 is a block diagram showing a configuration of a video encoding apparatus for implementing the video encoding method according to the present invention. As shown in FIG. 3, the video encoding apparatus 100 is provided with first input terminal 101, encoding mode controller 102 in which an encoding mode is set, second input terminal 103, region partitioning device 104 for partitioning an image into multiple regions, and encoder 105. The encoding mode controller 102 has region determining unit 116.

The operation of video encoding apparatus 100 of the above configuration and each of steps of the video encoding method implemented thereby will be described below.

Figure 4:
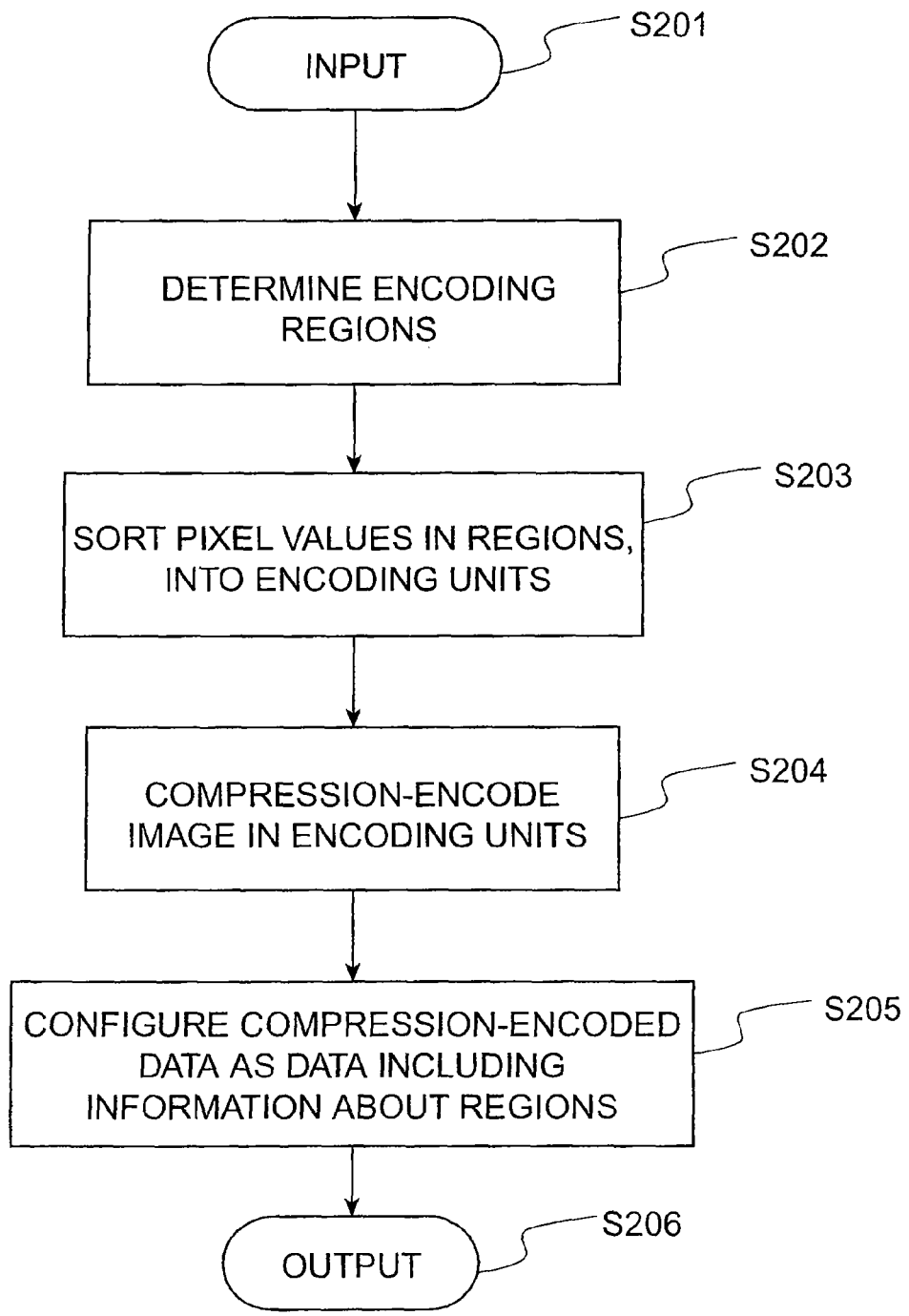
FIG. 4 is a flowchart showing the flow of the process of implementing the video encoding method according to the present invention.

Conditions for encoding of an image are entered through input terminal 101 (S201 in FIG. 4). Input means will differ depending upon application programs and conceivable means include, for example, a mode of entering a predetermined template according to a compression rate, a mode in which a user enters designated conditions through a keyboard, and so on.

The aforementioned encoding modes include image encoding modes. The encoding modes are, for example, as follows.

(1) A frame mode of performing encoding without separating scan lines constituting an image.

(2) A field mode of performing encoding with separating even scan lines and odd scan lines constituting an image from each other.

(3) An encoding-unit-switching mode of partitioning an image into multiple encoding units and performing encoding in encoding units by either the frame mode or the field mode (MB_AFF mode).

(4) An image-unit-switching mode of performing encoding in image units by either the frame mode or the field mode.

(5) A first combination mode which combines (1) with (3).

(6) A second combination mode which combines (2) with (3).

According to these modes, the region determining unit 116 determines regions for encoding (S202 in FIG. 4). Details of the processing will be described later with FIG. 5. An image as a target for encoding is fed through the second input terminal 103, and is then partitioned into multiple regions (slices) according to the regions determined at S202, by the region partitioning unit 104. At the same time, the region partitioning unit 104 divides pixel values included in the regions, in encoding units (S203 in FIG. 4).

The encoding units differ according to the encoding modes. In the frame mode, the encoding units are macroblocks each consisting of 16×16 pixels; in the field mode, the encoding units are macroblocks each consisting of 16×16 pixels; in the encoding-unit-switching mode, the encoding units are "macroblock pairs" each consisting of 16×32 (where 32 is the number of vertical pixels) pixels. The size of encoding units may be any size other than 16×16 and 16×32.

The image having the pixel values divided in encoding units at S203 is fed to the encoder 105 and thereafter is compression-encoded in encoding units by motion compensation and discrete cosine transform (S204 in FIG. 4). Namely, ME/MC (: Motion Estimation/Motion Compensation) 114 detects a motion vector of the image, using a reference image stored in frame memory 113, and thereafter a difference is calculated from a motion-compensated predictive signal (108 in FIG. 3). Furthermore, the difference signal is subjected to discrete cosine transform in DCT 109, thereafter the resultant data is quantized in Q (Quantization) 110, and then quantized data is subjected to variable-length coding in VLC (: Variable Length Coding) 115. This results in generating compression-encoded data.

On the other hand, the quantized signal is subjected to inverse quantization and inverse discrete cosine transform in IQ+IDCT (: Inverse Quantization+Inverse Discrete Cosine Transform) 111, and thereafter the resultant is added to the predictive signal 162 (112 in FIG. 3), thereby generating an image. The generated image is stored as a reference image into the frame memory 113. An image encoded in the frame mode is regenerated here and thereafter is stored into the frame memory 113 as it is. An image encoded in the field mode is regenerated here, and thereafter is stored into the frame memory 113 after merging of even scan lines and odd scan lines. An image encoded in the MB_AFF mode is regenerated here and thereafter is stored in the form of macroblock pairs into the frame memory 113.

The compression-encoded data generated at S204 is fed to header information adding unit 106 (HDR in FIG. 3) and is combined with the encoding mode information including the image encoding mode and information about the shape of regions to obtain data in a predetermined format (S205 in FIG. 4). Then the data is transmitted or recorded via the output terminal 107 (S206 in FIG. 4). The information about the shape of regions herein is a rule for generating the regions, and examples thereof are the orders indicated by dashed arrow 404 shown in after-described FIG. 6(*a*) and indicated by dashed arrow 408 shown in after-described FIG. 6(*b*).

Subsequently, the process of determining the regions for encoding at S202 of FIG. 4 will be described with reference to FIG. 5. FIG. 5 is a diagram showing the flow of the process for defining (or determining) the regions. When a signal is entered through input terminal 101 at S301, encoding mode information used in the entire moving picture is acquired from this input signal (S302). The encoding mode is one of the aforementioned modes (1) to (6).

Next step S303 is to determine whether a single mode is applied to all the images constituting the moving picture. When the result of the determination is affirmative (S303; YES), the flow moves to S304. In this case, since all the images are encoded in identical encoding units (macroblocks in the frame mode or macroblock pairs in the MB_AFF mode), the region structural unit (slice map unit) can be equal to an encoding unit.

In contrast to it, where the images constituting the moving picture are encoded in mutually different modes, i.e., where the result of the above determination is negative (S303; NO), the flow moves to S305. In this case, the sizes of encoding units in the respective encoding modes are compared with each other, and a largest encoding unit among them is selected as a region structural unit.

For example, where the frame mode and the MB_AFF mode are mixed as encoding modes, the encoding units in the respective modes are macroblocks and macroblock pairs. Therefore, a macroblock pair being the largest is selected as a region structural unit.

In the image-unit-switching mode of encoding each of the images constituting a video picture in image units by either the frame mode or the field mode, the region structural unit is 16 pixels (horizontal)×32 pixels (vertical). The reason for this is as follows.

As described previously, the encoding units in the frame mode are 16×16. On the other hand, the encoding units in each field in the field mode are also 16×16, and thus encoding units after merging of two fields forming one frame are substantially 16×32. Therefore, according to the rule of defining the largest encoding unit as the region structural unit (the rule described at S305), the region structural unit in the image-unit-switching mode is defined as 16×32 in conformity with the field mode having the largest encoding units.

The regions for partitioning of each image are defined on the basis of the region structural unit determined in this way (S306), and they are outputted (S307). Since each region is constructed on the basis of the region structural unit, the smallest region has the size equal to the region structural unit and a region smaller than it will never be defined.

Figures 6A, 6B:
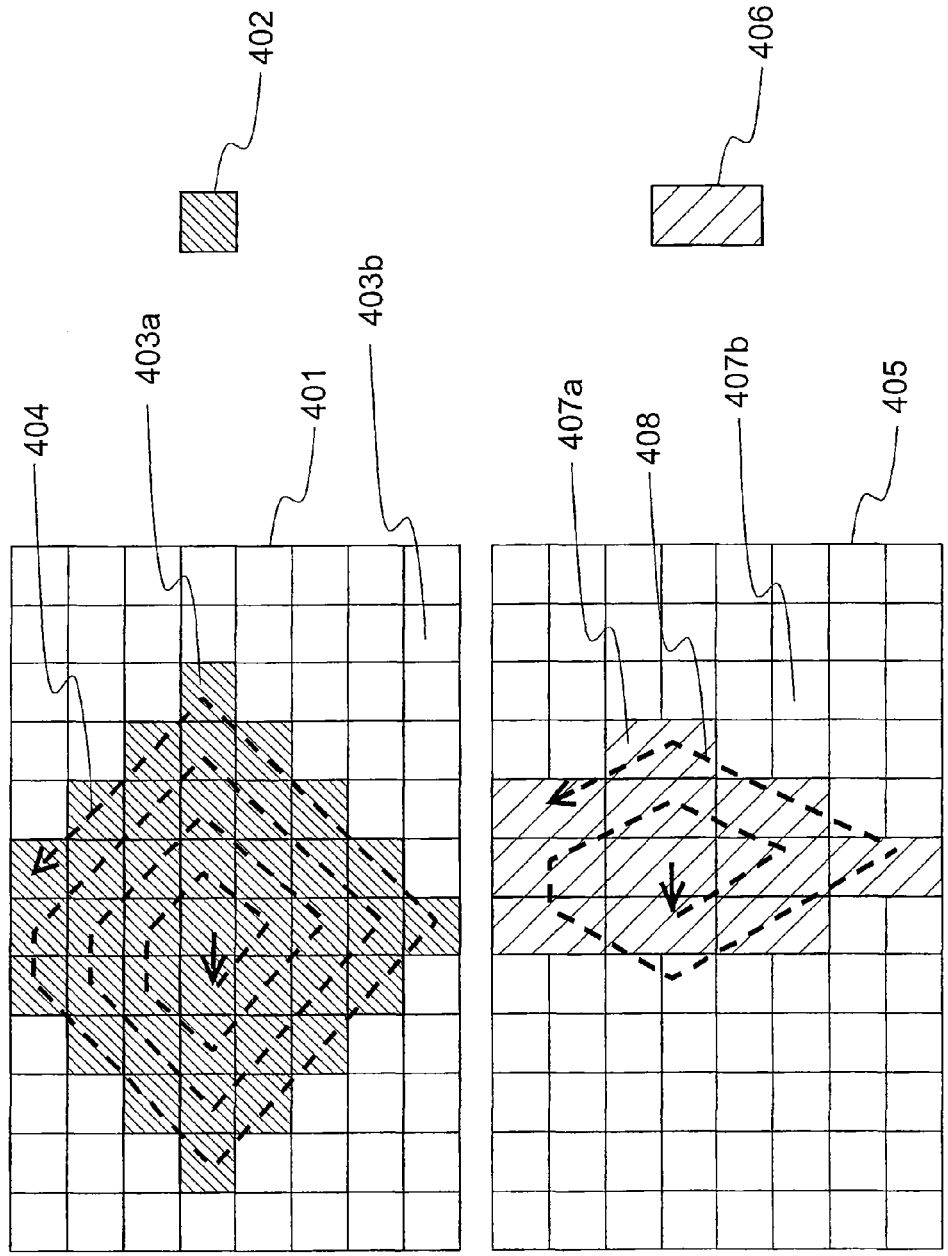
FIG. 6(a) is a diagram schematically showing regions of an image partitioned on the basis of the video encoding method according to present invention, in the case where the entire image is encoded in the frame mode.
FIG. 6(b) is a diagram schematically showing regions of an image partitioned on the basis of the video encoding method, in the case where the entire image is encoded in the MB_AFF mode.

FIG. 6(a) and FIG. 6(b) are diagrams showing examples of regions in images partitioned by the video encoding method according to the present invention. Concerning image 401 of FIG. 6(a), all images are assumed to be encoded in the frame mode, and the region structural unit is considered to be a macroblock of an encoding unit. The image 401 is partitioned into region 403a (filled region) and region 403b in accordance with the rule (order) indicated by dashed arrow 404. Block 402 represents the region structural unit.

Likewise, concerning image 405 of FIG. 6(b), all images are assumed to be encoded in the MB_AFF mode, and thus the region structural unit is considered to be a macroblock pair of an encoding unit. The image 405 is partitioned into region 407a (filled region) and region 407b in accordance with the rule (order) indicated by dashed arrow 408. Block 406 represents the region structural unit.

In the video encoding method according to the present invention, as described above, where the frame mode and the MB_AFF mode are mixed, the encoding units corresponding to the respective modes are macroblocks and macroblock pairs. A macroblock pair is selected as the largest of them and is defined as a region structural unit. Since the regions are defined on the basis of the macroblock pair, all the images will be partitioned as shown in the image 405 of FIG. 6(b), independent of the encoding modes.

Namely, the common region structural unit is determined instead of the encoding units, and regions of all the images are defined based thereon. This results in obtaining the same shape of regions by the partitioning according to the same rule, independent of the encoding modes of the respective images, whereby consistency is maintained between regions of temporally adjacent images. Consequently, the method and apparatus according to the present invention reduce the obstruction to human perception caused by change in the shape of regions due to the difference of encoding modes. At the same time, the method and apparatus reduce the adverse effect on the efficiency of predictive coding.

Second Embodiment

Subsequently, the second embodiment of the present invention will be described with reference to FIG. 7 and FIG. 8.

Figure 7:
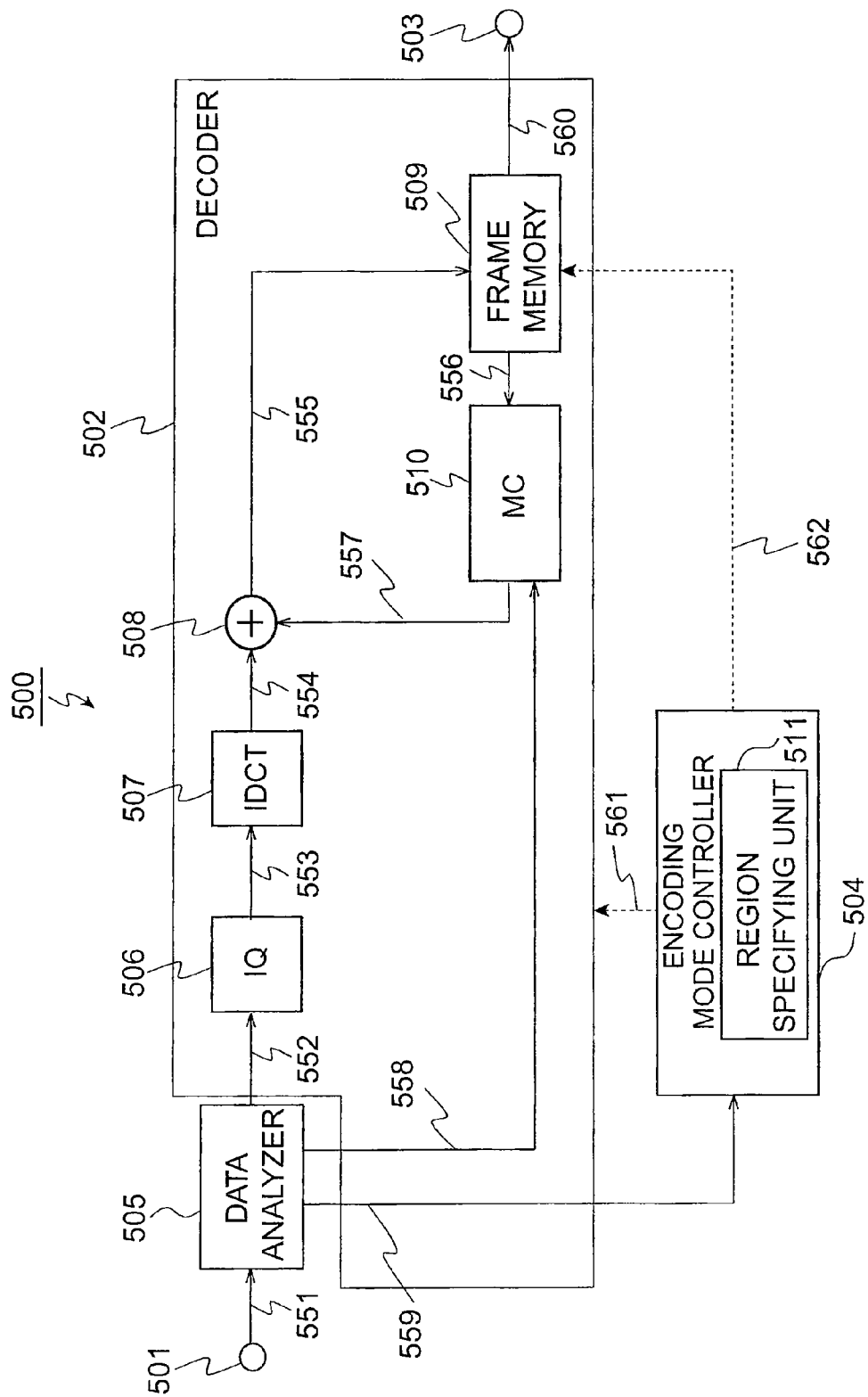
FIG. 7 is a block diagram showing the schematic configuration of the video decoding apparatus according to the present invention.

FIG. 7 is a block diagram showing a configuration of a video decoding apparatus for implementing the video decoding method according to the present invention. As shown in FIG. 7, the video decoding apparatus 500 is provided with input terminal 501, decoder 502, output terminal 503, encoding mode controller 504, and data analyzer 505. The encoding mode controller 504 has a region specifying unit 511.

The operation of the video decoding apparatus 500 of the above configuration and each of the steps of the video decoding method implemented thereby will be described below.

Figure 8:
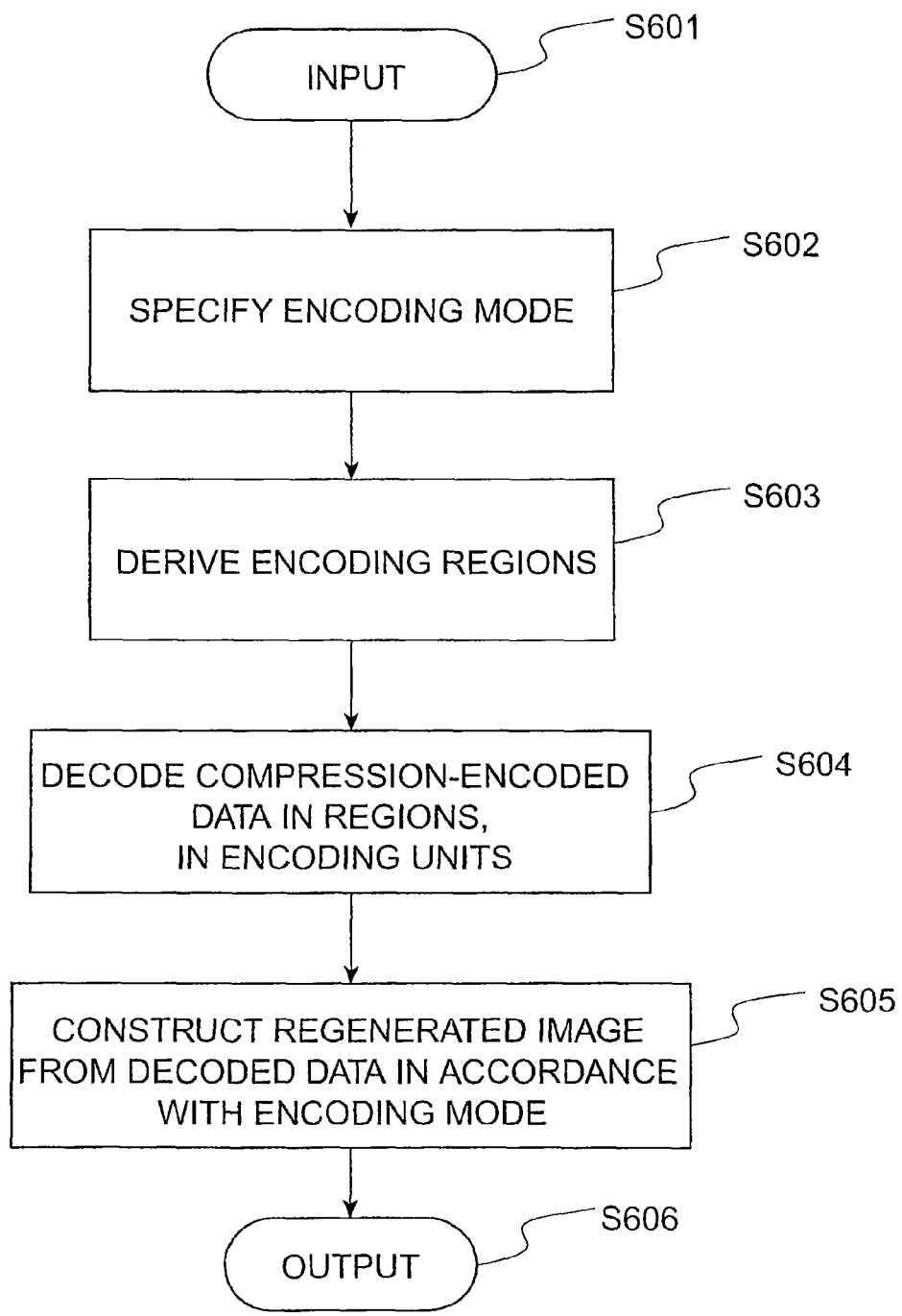
FIG. 8 is a flowchart showing the flow of the process of implementing the video decoding method according to the present invention.

Compression-encoded data generated by the video encoding method in the first embodiment is fed through input terminal 501 (S601 in FIG. 8). The compression-encoded data is analyzed by the data analyzer 505 to decode variable-length codes thereof, and thereafter header information is outputted to the encoding mode controller 504. The encoding mode controller 504 specifies the encoding mode of the compression-encoded data with reference to the encoding mode described in the header information (S602 in FIG. 8). The encoding mode specified herein is one of the modes (1) to (6) described in the first embodiment.

S603 is to derive the regions in encoding, based on the encoding mode thus specified and based on the region-generating rule described in the header information (the order indicated by dashed arrow 404 in FIG. 6(a)). The process of deriving the encoding regions in the present step is much the same as the process of determining the encoding regions described with reference to FIG. 5, and thus the illustration and detailed description thereof are omitted herein.

The compression-encoded data in the regions derived at S603 is decoded in encoding units (S604). Namely, the image data (DCT coefficients, motion information, etc.) outputted from the data analyzer 505 of FIG. 7 is fed into the decoder 502, and thereafter the data is subjected to inverse quantization in IQ (: Inverse Quantization) 506 on the basis of the encoding mode specified by the encoding mode controller 504. Thereafter, the dequantized data is subjected to inverse discrete cosine transform in IDCT (: Inverse Discrete Cosine Transform) 507, the image data is also subjected to motion compensation in MC (: Motion Compensation) 510, and thereafter the motion-compensated data is added to the predictive signal (508 in FIG. 7), thereby regenerating the image.

Furthermore, the regenerated image is stored into frame memory 509, and is outputted at its display time via the output terminal 503 to a display device (not shown). On the occasion of storing the regenerated image into the frame memory 509, the regenerated image is constructed using the data decoded at S604, in accordance with the encoding mode (S605).

Namely, an image encoded in the frame mode is first reconstructed and thereafter is stored into the frame memory 509 as it is. An image encoded in the field mode is first reconstructed, and thereafter is stored into the frame memory 509 after merging of even scan lines and odd scan lines. An image encoded in the MB_AFF mode is first reconstructed and thereafter is stored in the form of macroblock pairs into the frame memory 509.

Then the regenerated image constructed at S605 is outputted via the output terminal 503 to a display device (not shown).

In the video decoding method according to the present invention, as described above, the decoding is carried out on the situation in which the regions of each image are defined in the common region structural unit on the basis of the encoding mode. For this reason, the regions made by partitioning according to the same rule all are of the same shape, independent of the encoding modes of the respective images, so that consistency is maintained between regions of temporally adjacent images. Therefore, the method and apparatus according to the present invention reduce the obstruction to human perception caused by change in the shape of regions of regenerated images due to the difference of encoding modes. At the same time, the method and apparatus reduce the adverse effect on the efficiency of predictive encoding.

It is noted that the present invention is not limited to the contents described above in the first and second embodiments but can adopt appropriate modification embodiments without departing from the scope of the invention. For example, the above embodiments described the typical examples in which the encoding and decoding were carried out in the field mode while separating the even scan lines and odd scan lines of each image from each other, but the present invention is applicable to any separating method. For example, the present invention is also applicable to a case wherein the zeroth, fourth, eighth, and twelfth scan lines are separated out into a first subimage, the first, fifth, ninth, and thirteenth scan lines into a second subimage, the second, sixth, tenth, and fourteenth scan lines into a third subimage, and the third, seventh, eleventh, and fifteenth scan lines into a fourth subimage. In this case, supposing each subimage is encoded in macroblock units, it is necessary to define the region structural unit on the assumption that effective encoding units after merging of all the scan lines are sets of four macroblocks.

Lastly, a program for implementing the video encoding method or the video decoding method according to the present invention will be described with reference to FIG. 9.

Figure 9:
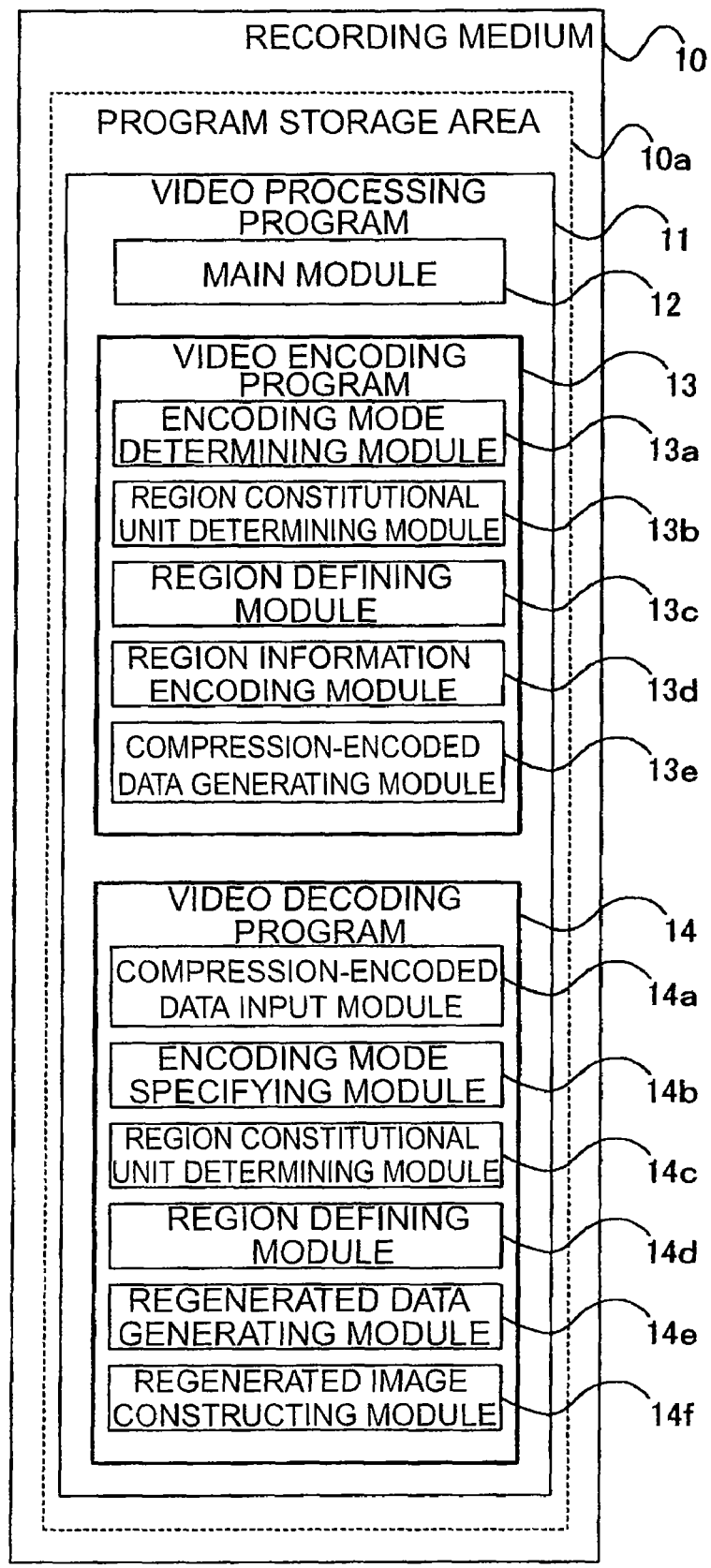
FIG. 9 is a diagram showing the configuration of the video processing program according to the present invention.

As shown in FIG. 9, video processing program 11 is stored in program storage area 10a formed in recording medium 10. The video processing program 11 can be executed by a computer, including a portable terminal, and has main module 12 responsible for video processing, after-described video encoding program 13, and after-described video decoding program 14.

The video encoding program 13 is comprised of encoding mode determining module 13a, region structural unit determining module 13b, region defining module 13c, region information encoding module 13d, and compression-encoded data generating module 13e. The functions substantialized by operation of these modules are similar to the functions substantialized by execution of the respective steps of the aforementioned video encoding method.

The video decoding program 14 is comprised of compression-encoded data input module 14a, encoding mode specifying module 14b, region structural unit determining module 14c, region defining module 14d, regenerated data generating module 14e, and regenerated image constructing module 14f. The functions substantialized by operation of these modules are similar to the functions substantialized by execution of the respective steps of the aforementioned video decoding method.

Figure 10A:
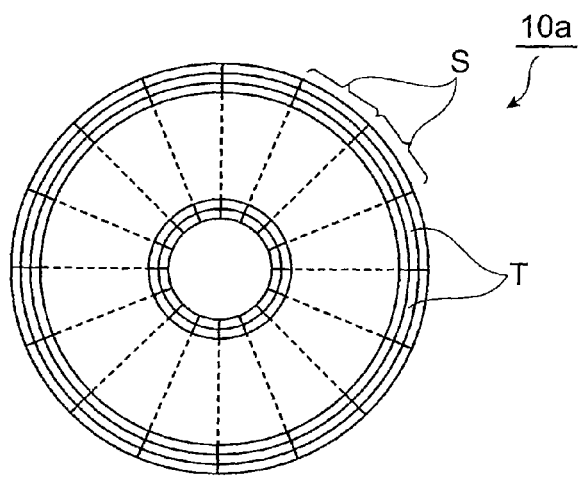
FIG. 10(*a*) is a diagram showing a configuration example of the storage area for the video processing program.

By recording the video processing program 11 in the recording medium 10, it becomes feasible to make a computer, including a portable terminal, readily execute the processing described in each of the above embodiments. More specifically, the video processing program 11 is stored in the program storage area 10a of a floppy disk having the physical format shown in FIG. 10(a), for example. A plurality of concentric tracks T are formed from the periphery toward the center in the program storage area 10a, and each track T is segmented into sixteen sectors S in the circumferential direction.

Figure 10B:
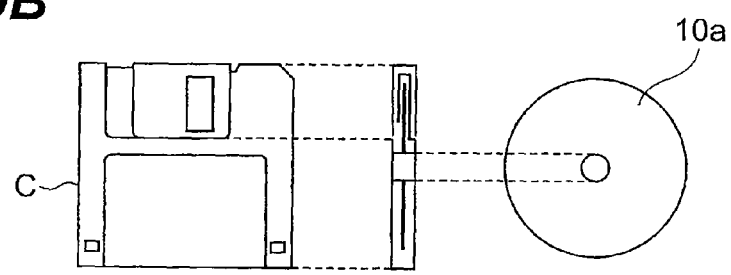
Figure 10C:
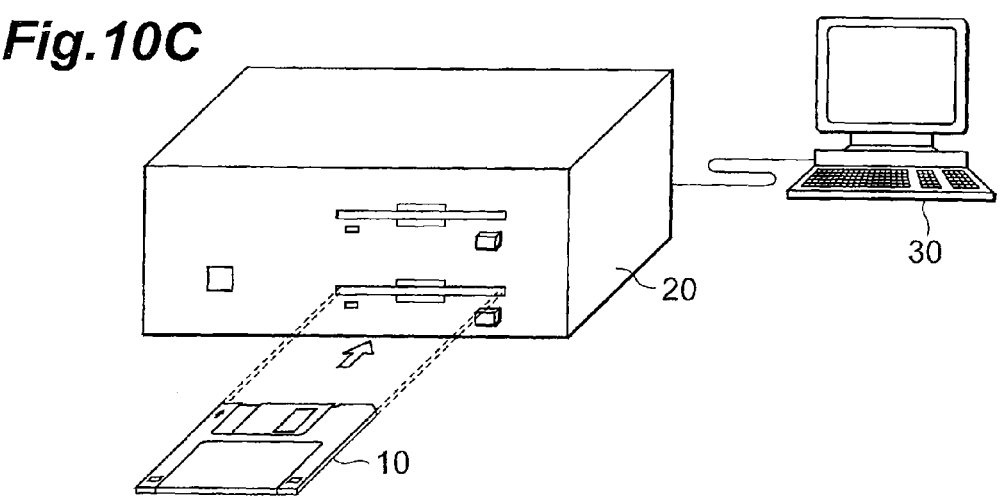

The program storage area 10a is housed in floppy disk casing C, as shown in FIG. 10(b), thereby forming a floppy disk as recording medium 10. When the recording medium 10 is mounted in floppy disk drive 20 connected through a cable to well-known, commonly used computer system 30, as shown in FIG. 10(c), the video processing program 11 shown in FIG. 9 becomes ready to be read out of the recording medium 10 and is transferred to the computer system 30.

The recording medium 10 is not necessarily limited to the floppy disk, but it can be any form as long as the program can be recorded therein; for example, it can be a hard disk, an IC (Integrated Circuit) card, a ROM (Read Only Memory), or the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for decoding coded video data, comprising computer-executable steps performed by a processor of a video decoder to implement:
   receiving a coded video sequence comprising coded pictures which collectively form slice groups each made of slice group map units; and
   if the coded pictures in the coded video sequence comprise coded pictures coded under an image unit switching mode and further comprise a pair of coded fields coded as a frame, assigning units of vertically contiguous two macroblocks to the slice group map units.

2. The method according to claim 1, further comprising, if the coded pictures in the coded video sequence comprise coded pictures coded under an encoding unit switching mode, assigning macroblock pair units to the slice group map units.

3. The method according to claim 2, further comprising, assigning units of macroblocks to the slice group map units if every coded picture of the coded video sequence is a coded frame containing only frame macroblocks.

4. The method according to claim 2, further comprising, assigning units of macroblocks to the slice group map units if the coded pictures in the coded video sequence comprise coded pictures coded as fields.

5. A decoder for decoding coded video data, comprising a processor of a computer system and a memory that stores computer-executable programs executed by the processor to:
   receive a coded video sequence comprising coded pictures which collectively form slice groups each made of slice group map units; and
   if the coded pictures in the coded video sequence comprise coded pictures coded under an image unit switching mode and further comprise a pair of coded fields coded as a frame, assign units of vertically contiguous two macroblocks to the slice group map units.

6. The decoder according to claim 5, wherein if the coded pictures in the coded video sequence comprise coded pictures coded under an encoding unit switching mode, the processor assigns macroblock pair units to the slice group map units.

7. The decoder according to claim 6, wherein the processor assigns units of macroblocks to the slice group map units if every coded picture of the coded video sequence is a coded frame containing only frame macroblocks.

8. The decoder according to claim 6, wherein the processor assigns units of macroblocks to the slice group map units if the coded pictures in the coded video sequence comprise coded pictures coded as a fields.

9. A non-transitory computer-readable medium storing instructions which, when executed by a processor of a video data decoder, cause the processor to:
   receive a coded video sequence comprising coded pictures which collectively form slice groups each made of slice group map units; and if the coded pictures in the coded video sequence comprise coded pictures coded under an image unit switching mode and further comprise a pair of coded fields coded as a frame, assign units of vertically contiguous two macroblocks to the slice group map units.

10. The computer-readable medium according to claim 9, further storing instructions which, when executed by the processor, cause the processor to assign macroblock pair units to the slice group map units, if the coded pictures in the coded video sequence comprise coded pictures coded as a frame.

11. The computer-readable medium according to claim 10, further storing instructions which, when executed by the processor, cause the processor to assign units of macroblocks to the slice group map units, if every coded picture of the coded video sequence is a coded frame containing only frame macroblocks.

12. The computer-readable medium according to claim 10, further storing instructions which, when executed by the processor, cause the processor to assign units of macroblocks to the slice group map units, if the coded pictures in the coded video sequence comprise coded pictures coded as a field.

* * * * *